June 26, 1923.

E. MEYERCORDT

MOUNTING FOR SLIP RINGS OF DYNAMO ELECTRIC MACHINES

Filed Sept. 9, 1920

1,460,031

Inventor
Ernst Meyercordt
By Knight Bros
Attys.

Patented June 26, 1923.

1,460,031

UNITED STATES PATENT OFFICE.

ERNST MEYERCORDT, OF LOCKNITZ, NEAR STETTIN, GERMANY.

MOUNTING FOR SLIP RINGS OF DYNAMO-ELECTRIC MACHINES.

Application filed September 9, 1920. Serial No. 409,281.

*To all whom it may concern:*

Be it known that I, ERNST MEYERCORDT, director, a subject of the German Republic, residing at Locknitz. near Stettin, Germany, have invented certain new and useful Improvements in Mountings for Slip Rings of Dynamo-Electric Machines, of which the following is a specification.

In connection with electric machines having slip-rings, for example polyphase current motors, a method heretofore adopted for fixing these rings consists in shrinking the same upon a jacket of micanite upon the shaft. This method has the disadvantage that when the machine becomes hot, as is unavoidable, the slip rings become loose, and this leads to inconvenient disturbances in working.

The object of this invention is to remove this disadvantage, and this is done by bevelling the hubs of the slip rings and making them engage under each other and under an under-cut portion of the sleeve or bush, against which under-cut portion they are held by a ring placed on the sleeve and engaging under the last hub of the series.

Figure 1:
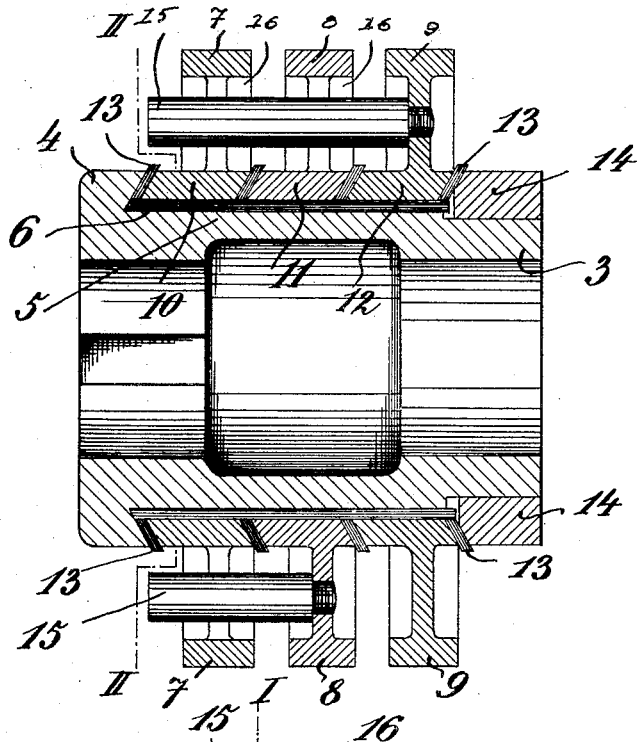
Figure 2:
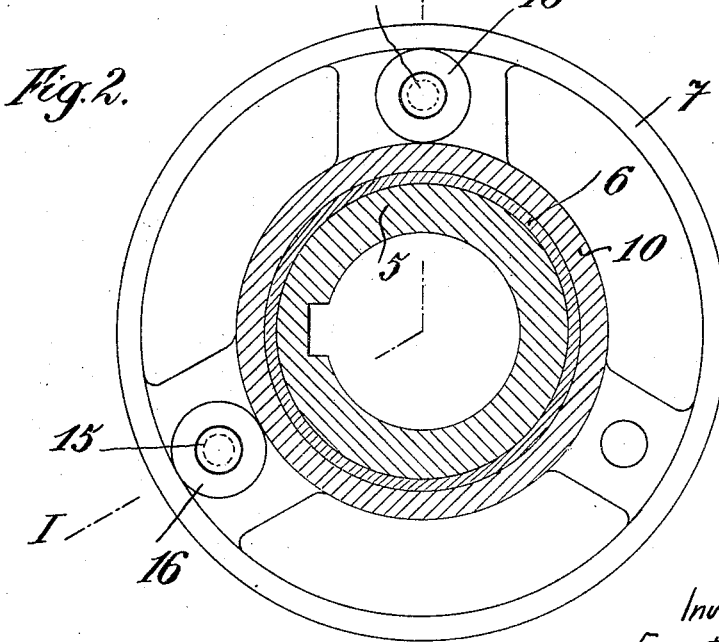

The invention is illustrated in the annexed drawing, showing one form of construction, Fig. 1 being an axial section, on the line I—I of Fig. 2, of the slip-rings of a three phase motor, and Fig. 2, a section on the line II—II of Fig. 1.

To the motor shaft is keyed the sleeve 3, which has an upstanding flange 4, and upon the cylindrical part 5 of which there is a sleeve 6 of insulating material. Upon this sleeve 6 are seated the hubs 10, 11, 12 of the slip-rings 7, 8, 9, with insulating washers 13 interposed between them, and these hubs are held against each other by a ring 14 placed on the sleeve 3. The flange 4, the hubs 10, 11, 12 and the ring 14 are so shaped that they engage one under the other, as shown in Fig. 1. For this purpose the hubs 10, 11 and 12 are prismatic rings of parallelogram cross section.

The connectors for the several slip rings are shanks 15 of different lengths, each screwed into one of the rings, and the longer shanks passing through holes 16 in the arms of the adjacent rings. There is no risk of displacement of the slip rings 7, 8 and 9 in relation to each other, either in the cold or the hot state, as they are firmly held together by the ring 14, and the tightness increases with heat, as the hubs expand against each other. The connectors 15 can, therefore, pass freely through the rings.

The parallelogram section has in practice been found the most practical for the slip-ring hubs, but of course the invention is not confined to it. Many different forms of cross section can be used, provided the under-cutting action is obtained.

What I claim is:

1. In combination with a slip ring support having an axially presented recess, a slip ring having an axial projection engaging said recess, said slip ring having an axially presented recess on the side opposite to said projection, and means clamping said slip ring against said support in axial direction, said clamping means having an axial projection engaging the recess in said slip ring.

2. In combination with a slip ring support having an abutment, a plurality of slip rings mounted upon said support, and means clamping said slip rings together against said abutment in axial direction, the adjacent surfaces of said abutment, slip rings and clamping means being oblique to the axis and mating the one with the other in series.

3. In combination with a slip ring support having an abutment, a plurality of slip rings mounted upon said support, means clamping said slip rings together against said abutment in axial direction, the adjacent surfaces of said abutment, slip rings and clamping means being oblique to the axis and mating the one with the other in series and insulating washers between said mating surfaces.

4. In combination with a slip ring support, a plurality of prismatic slip rings of parallelogram cross section mounted on said support with their adjacent surfaces mating the one with the other in series, and means clamping said slip rings together in axial direction.

ERNST MEYERCORDT.